Figure 1:
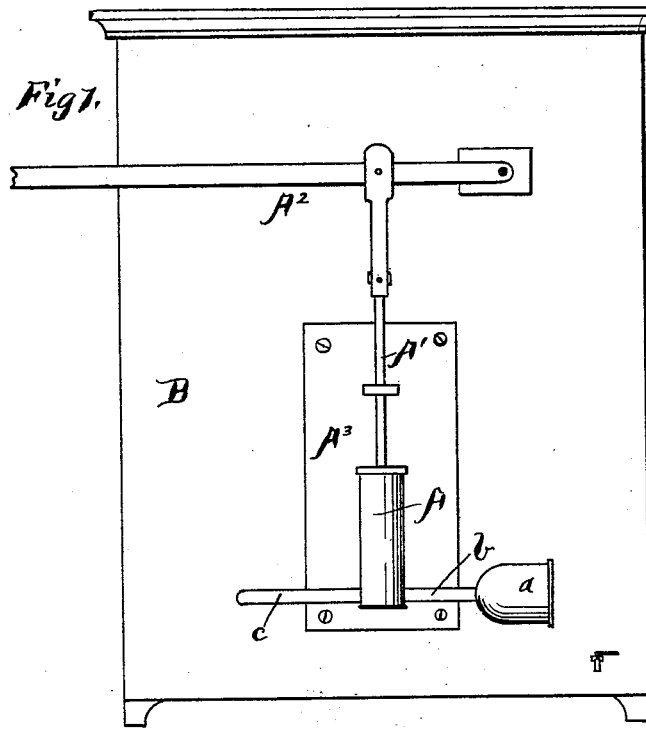

No. 684,385. Patented Oct. 8, 1901.
J. F. SANDERS.
REFRIGERATING, CONGEALING, AND FREEZING APPARATUS.
(Application filed Apr. 29, 1901.)

(No Model.) 3 Sheets—Sheet 1.

Witnesses.
Samuel W Banning.
Thomas B. McGregor

Inventor.
John F. Sanders,
By Banning & Banning,
Att'ys.

No. 684,385. Patented Oct. 8, 1901.
J. F. SANDERS.
REFRIGERATING, CONGEALING, AND FREEZING APPARATUS.
(Application filed Apr. 29, 1901.)
(No Model.) 3 Sheets—Sheet 2.
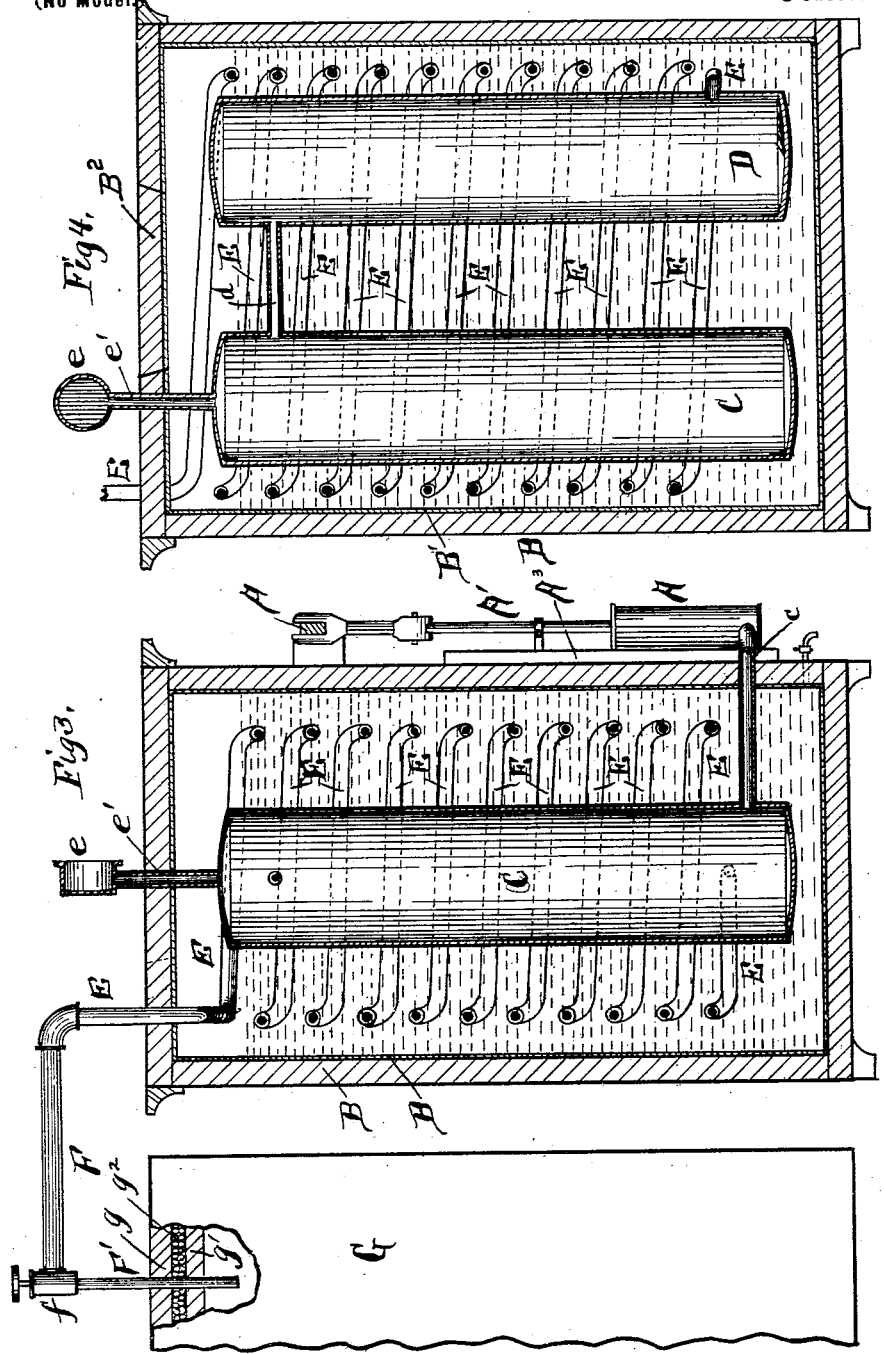
Witnesses.
Samuel W. Banning.
Thomas B. McGregor.
Inventor.
John F. Sanders.
By Banning & Banning,
Attys.

No. 684,385. Patented Oct. 8, 1901.
J. F. SANDERS.
REFRIGERATING, CONGEALING, AND FREEZING APPARATUS.
(Application filed Apr. 29, 1901.)
(No Model.) 3 Sheets—Sheet 3.
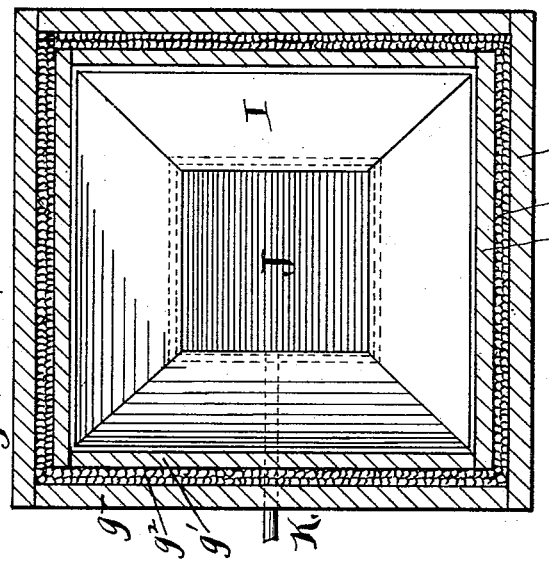
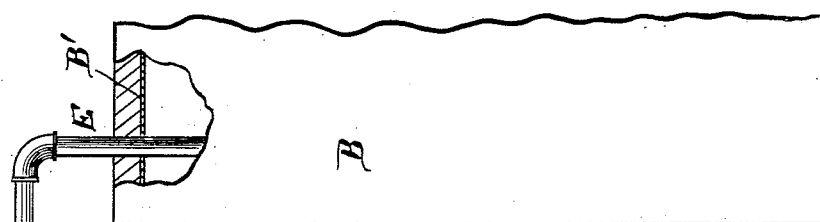
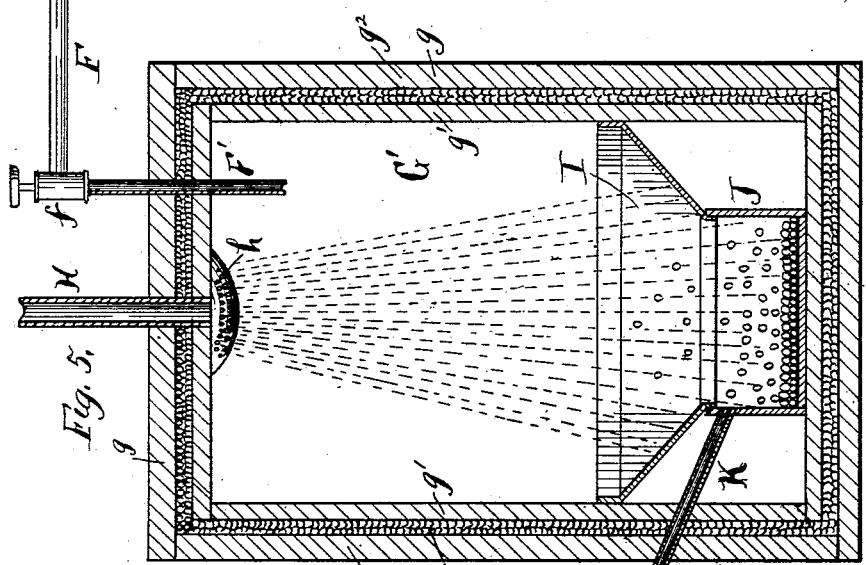
Witnesses,
Samuel W. Banning.
Thomas B. McGregor.
Inventor,
John F. Sanders.
By Banning & Banning,
Attys.

UNITED STATES PATENT OFFICE.

JOHN F. SANDERS, OF BOISE, IDAHO, ASSIGNOR OF ONE-THIRD TO THOMAS A. BANNING, OF CHICAGO, ILLINOIS.

REFRIGERATING, CONGEALING, AND FREEZING APPARATUS.

SPECIFICATION forming part of Letters Patent No. 684,385, dated October 8, 1901.

Application filed April 29, 1901. Serial No. 57,980. (No model.)

*To all whom it may concern:*

Be it known that I, JOHN F. SANDERS, a citizen of the United States, residing at Boise, in the county of Ada and State of Idaho, have invented a certain new and useful Improvement in Refrigerating, Congealing, and Freezing Apparatus Employing Compressed Air, of which the following is a specification.

It is well known that in the compression of air heat is imparted thereto in direct proportion to the degree of compression, and it is equally as well known and an established principle of compressed air that when the conditions are proper the heat produced by the act of compression will be absorbed, and it is likewise well settled that compressed air after having been deprived of its heat will when released from confinement and allowed to expand produce a cold or reduced low temperature, according to the condition of the air as regards compression and the environments under which it is permitted to escape from confinement and expand. It is this last well-known characteristic of compressed air that is utilized in the present invention for the purpose of producing refrigeration or for operation in the application of a cold or low temperature for various purposes.

The object of the invention is to construct a simple, practical, and efficient apparatus by means of which air can be readily and quickly compressed and during the act of compression or when compressed have the heat produced from the compression absorbed, leaving the air in a cool state and in the best possible condition for releasing from confinement to expand and produce cold or reduced lower temperatures and so that the benefits and advantages of air as a refrigerant or freezing medium can be utilized with economy and success.

The invention consists in the features of construction and combination of parts hereinafter described and claimed.

In the drawings a form of apparatus well adapted for carrying out the invention is illustrated.

Figure 2:
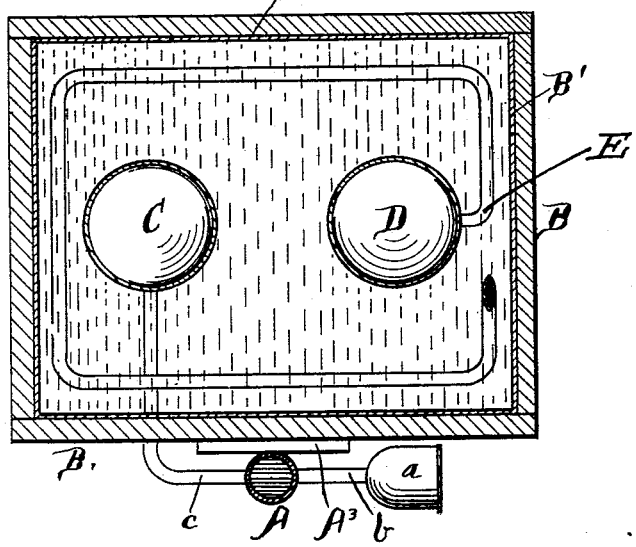

Figure 1 is a front elevation showing a receptacle or box for containing the compressed-air receivers or tanks and the coil or pipe connected therewith and showing also a compression cylinder or pump, by means of which the air is compressed in the receivers or tanks; Fig. 2, a cross-section on a line through the compression cylinder or pump and above the induction and eduction pipes for the air; Fig. 3, a sectional elevation endwise of the apparatus and through the initial or first receiver or tank for the compressed air and showing also, in elevation, a portion of a refrigerator or cooling-box into which the compressed air is projected from the cooling-coil; Fig. 4, a sectional elevation transversely of the apparatus, showing both of the receivers or tanks for storing compressed air; Fig. 5, a side elevation of a portion of the receptacle containing the compressed-air receivers or tanks and the cooling-coil and showing also, in sectional elevation, a receptacle or box into which the compressed air is projected for making ice, for which purpose the receptacle or box is shown with a water-pipe and sprayhead therefor and a mold in which to form the cake of ice; and Fig. 6, a cross-section of the receptacle or box for making ice, taken on a line above the mold for the cake of ice and the funnel by which the frozen spray is formed so as to properly enter the mold.

The apparatus shown for compressing air and absorbing the heat therefrom produced by the act of compression and utilizing the cooled air is shown in the drawings in connection with a refrigerator or cooling-box and also in connection with an ice-making machine, it being understood that the apparatus and its resultant product (cold air) are capable of and adapted to be used in connection with other appliances than a refrigerator or cooling-box and an ice-producing machine, where the appliances are of a character to require cold air for refrigerating or other purposes.

The apparatus in the arrangement and construction shown employs an air-compressing cylinder or pump A, of any usual and well-known form of construction, having a reciprocating piston operated by a piston-rod A', connected with an actuating-lever A², and, as shown, the compression cylinder or pump A is attached to a plate A³, which in turn is secured to a side wall of the receptacle or casing which contains the receivers or tanks for the compressed air, the conducting or cooling coil, and the cooling liquid, and the lever for operating the cylinder or pump is also attached to the side wall of this same receptacle or casing, as shown in Fig. 1.

The receptacle or casing B is formed with an outer wall, of wood or other suitable material, and an inner lining B', of metal or other suitable material, and this receptacle or casing is to have an interior diameter sufficient to locate therein one, two, or more receivers or tanks for compressed air, as may be desired for the capacity of the apparatus in performing the required work. As shown, the receptacle or casing contains a receiver or tank C and a receiver or tank D, located side by side and of the same capacity for each. The receiver or tank C can be termed the "first" or "initial" one, and the receiver or tank D can be termed the "final" or "discharging" one, and the first or initial tank receives the air direct from the compression cylinder or pump, and, as shown, air enters a bell-mouth or funnel a, which can be filled with cotton or other material, so as to act as a filter and purify the air from dust, moisture, microbes, germs, or other possible impurities and prevent the same from passing into the compression cylinder or pump through the pipe b, leading from the bell-mouth or funnel to the cylinder or pump, and from the cylinder or pump the air drawn thereinto is forced out through the pipe c into the initial or first receiver or tank C, and from the receiver or tank C the air is conducted into the receiver or tank D by the pipe or tube d, located, as shown, near the top of the two receivers or tanks and having a communication with both. A coiled pipe E is connected at its start with the bottom or lower portion of the receiver or tank D, and this pipe is coiled or laid in manifolds around the four sides of the receptacle or casing B, on the inside thereof, and is carried out through the top of the receptacle or casing. This pipe E, laid in coils or manifolds, constitutes as a whole the cooling-pipe for the air which passes therethrough from the receivers or tanks, and the pipe should have a length and diameter sufficient to insure the perfect and complete cooling of the compressed air in passing through the pipe, such cooling being assisted by a cooling medium, which may be a solution of water with about twenty per cent. of salt or any other suitable solution contained in the receptacle or casing B and of a sufficient quantity to cover the tanks and the cooling-pipe. The amount of compression in the arrangement shown is indicated by a gage e, connected by a pipe or tube e' with the initial or first receiver or tank, so that the operator by examining the gage can determine whether the pump has been operated to the extent required for the amount of compression wanted. The top of the receptacle or casing can be provided with a cover B², fitted air-tight, and by means of which access can be had to the interior of the receptacle. The cooling-pipe at its other end has connected therewith in the form shown in Fig. 3 a pipe F, terminating in a controlling-valve f, which regulates the supply of air that may be passed through the discharge-pipe F', leading into the place of discharge for the air. The discharge-pipe F' in the construction shown in Fig. 3 terminates within the interior of a refrigerator or cooling-box G, which box may be of the construction shown, having an outer wall g, an inner wall g', and a filling g² of any suitable material, so as to make a refrigerator or cooling-box which will not be subject to the influence of outside air to any hurtful extent.

The operation of the apparatus for compressing and cooling the air is briefly as follows: The compression cylinder or pump is operated, drawing air thereinto through the bell-mouth or funnel a and pipe b and discharging air therefrom through the pipe c for the discharged air from the cylinder or pump to enter the receivers or tanks C and D and the cooling-pipe E to the limit of the controlling-valve f, which when the air is being compressed is kept closed. The operation of the compression cylinder or pump is continued until the desired pressure in the receivers or tanks and the cooling-pipe has been reached, which pressure may be from seventy to one hundred pounds, the pressure being indicated by the gage e on the initial or first tank or receiver. This compression of air in the receivers or tanks and the conducting or cooling pipe will create considerable heat in both receivers or tanks and the pipe, and this heat will be readily absorbed by the cooling solution surrounding and submerging the receivers or tanks and the pipe, and in this connection it is important that the cooling-pipe should be of a diameter sufficiently small consistent with the capacity to deliver the necessary quantity of air at the discharge-controlling valve, and it is also important that the cooling solution should be in quantity sufficiently large as not to attain a high temperature, as a high temperature would defeat the purpose of the invention. The charging of the receivers or tanks and the conducting or cooling pipe connected therewith can be discontinued by stopping the operation of the cylinder or pump when the desired pressure has been reached, and the pressure will be retained in the receivers or tanks and the cooling-pipe until the discharge-controlling valve is open to permit the escape through the discharge-pipe.

The construction shown in Fig. 3 is an adaptation of the invention for use in connection with a refrigerator or cooling-box, and to attain the cooling result the escape-valve f is opened, allowing the stored compressed air to pass from the receivers or tanks through the conducting or cooling pipe and be projected through the discharge-pipe F' into the interior of the refrigerator or storage-box, where it at once expands to the normal or natural pressure of the atmosphere, and in so expanding the air will again absorb or take up from the substances contained in the refrigerator or cooling-box, against which the air contacts, a proportionate amount of heat that was previously absorbed from the air in its compression in the receivers or tanks subject to the action of the cooling medium, and this absorption or taking up of heat from the articles produces a refrigeration of the same, by which keeping properties are added thereto, thus enabling the compressed air as it is discharged into the refrigerator or cooling-box to act and become the refrigerant for preserving purposes.

It will be understood that the higher or greater the air has been compressed the higher or greater will be the heat developed in the receivers or tanks and absorbed from the air and the receivers or tanks and the cooling-pipe by the cooling solution, and under these circumstances it follows that with the discharge of the air under a high degree of compression a greater degree of cold is produced in the refrigerator or cooling-box, in which the expansion of the air occurs. Within certain limits the temperature may be varied by the extent of compression produced by the compression cylinder or pump. The first cooling or reducing of the temperature of the refrigerator, cooling-box, or storage-room will require a considerable supply of compressed air; but after the temperature has been reduced to the degree desired a very small amount of compressed air is all that need be permitted to expand in order to maintain the low temperature, and for this reason after the air receivers or tanks have been charged with compressed air the charge will maintain the temperature for many hours without requiring any operation of the compression cylinder or pump, the time depending on existing conditions.

The apparatus is well adapted for use in the production of artificial ice, and an arrangement for this purpose is shown in Figs. 5 and 6. Only a portion of the cooler for the compressed air is shown; but such cooler has receivers or tanks and a cooling-coil surrounded by and immersed in a cooling solution, as described. The discharge-pipe F' leads into a receptacle G', into the interior of which the pipe discharges the air under a regulated pressure from the valve. A water-supply pipe H, leading from a suitable source of supply, is entered at its discharge end into the top of the receptacle, and, as shown, the discharge end has thereon a perforated head or rose $h$, from which the water will be discharged in a fine spray. The interior of the receptacle G', near its bottom, has a funnel-shaped receiver I, into which the spray of water descends subject to the action of the cold produced by the air discharged into the interior of the receptacle and expanded therein. The funnel-shaped receiver has entered beneath it a mold J, into which the frozen spray and small drops or particles of frozen water fall, and into this mold a supply of water is discharged from the pipe K, leading to any source of supply for such water to complete the freezing operation, forming in the mold a cake of solid ice.

The compressed air is admitted into the interior of the receptacle G' and expanded therein by opening the controlling-valve for the discharge-pipe, and when the expanded air has created a sufficient cold temperature within the receptacle water is allowed to pass from the pipe H through the perforated head or rose and descend in fine spray or drops, which in falling downward give off their heat to the cold air and turn into ice flakes or drops, which fall into the funnel-shaped receiver and descend into the mold beneath the receiver, and when a sufficient quantity of these frozen flakes or drops have been deposited in the mold water is admitted thereinto from the pipe K in sufficient amount to fill the spaces or interstices between the frozen flakes and ice balls, congealing the mass into a solid cake of ice. When the mold is full and frozen solid it is to be removed from beneath the receiver and from the receptacle and another mold put in its place, when the same operation is repeated, forming a block in the new mold. These operations can be continued until the required amount of ice has been produced.

The advantages of making ice by the direct application of cold or a low temperature, produced by expanding compressed air in a chamber and subjecting a spray of water to the effects of the freezing temperature caused by the expansion of the air are numerous. The ice will be pure if the water used is pure. The solidity of the cake will be assured. The operation can be conducted rapidly and without inconvenience and trouble and great economy of production is obtained.

The apparatus is exceedingly simple in construction and does not require any special skill in its operation nor any considerable amount of space to be set up ready for use, and in use it is well adapted for all climates, and especially for isolated places or places not readily accessible for the installation of refrigerating apparatus of the usual construction, and in use for cold-storage or refrigeration, owing to the application of the purified compressed air directly to the article in storage, the danger and liability of ill effects will be nominal, as all the dust, moisture, microbes, germs, and other impurities have been removed, and as a means for the production of ice the use of the apparatus in connection with a water-spray will be found very economical and especially applicable and adaptable for climates and localities where the ordinary ice plants cannot be employed except at great expense and under difficulties not experienced in the apparatus of my invention.

What I regard as new, and desire to secure by Letters Patent, is—

1. In an apparatus for refrigerating, congealing and freezing, the combination of an air-compressing cylinder or pump, a receptacle adapted to contain a cooling medium, an air receiver or tank into which air is forced and stored under pressure from the compressing cylinder or pump, a cooling-coil connected with and surrounding the receiver or tank and immersed and covered together with the receiver or tank by the cooling medium in the receptacle and an eduction-pipe leading from the coil to discharge the compressed air into an atmosphere of less density thereby allowing it to expand, substantially as described.

2. In an apparatus for refrigerating, congealing and freezing, the combination of an air-compressing cylinder or pump, a receptacle adapted to contain a cooling medium, an air receiver or tank into which air is forced and stored under pressure from the compressing cylinder or pump, a cooling-coil connected with and surrounding the receiver or tank and immersed and covered together with the receiver or tank by the cooling medium in the receptacle, and a valve-controlled discharge-pipe connected with the cooling-coil, substantially as described.

3. In an apparatus for refrigerating, congealing and freezing, the combination of an air-compressing cylinder or pump, a receptacle adapted to contain a cooling medium, an air receiver or tank into which air is forced and stored under pressure from the compressing cylinder or pump, a cooling-coil connected with and surrounding the receiver or tank and immersed and covered together with the receiver or tank by the cooling medium in the receptacle, a valve-controlled discharge-pipe connected with the cooling-coil, and a receptacle or chamber into which the discharge-pipe projects air, substantially as described.

4. In an apparatus for refrigerating, congealing and freezing, the combination of an air-compressing cylinder or pump, a receptacle adapted to contain a cooling medium, an air receiver or tank into which air is forced directly from the pump and stored under pressure from the compressing cylinder or pump, a cooling-coil connected with and surrounding the receiver or tank and immersed and covered together with the receiver or tank by the cooling medium in the receptacle, a valve-controlled discharge-pipe connected with the cooling-coil, a receptacle or chamber into which the discharge-pipe projects air, and a water-supply pipe having a discharge perforated head or rose located in the receptacle or chamber into which the compressed air is projected, for the air to congeal or freeze the spray or drops of water as they descend in the receptacle or chamber, substantially as described.

5. In an apparatus for refrigerating, congealing and freezing, the combination of an air-compressing cylinder or pump, a receptacle adapted to contain a cooling medium, an air receiver or tank into which air is forced and stored under pressure from the compressing cylinder or pump, a cooling-coil connected with and surrounding the receiver or tank and immersed and covered together with the receiver or tank by the cooling medium in the receptacle, a valve-controlled discharge-pipe connected with the cooling-coil, a receptacle or chamber into which the discharge-pipe projects air, a water-supply pipe having a discharge perforated head or rose located in the receptacle or chamber into which the compressed air is projected, for the air to congeal or freeze the spray or drops of water as they descend in the receptacle or chamber, and a mold into which the frozen spray or drops of water are deposited for formation into a cake of ice, substantially as described.

6. In an apparatus for refrigerating, congealing and freezing, the combination of an air-compressing cylinder or pump, a receptacle adapted to contain a cooling medium, an air receiver or tank into which air is forced and stored under pressure from the compressing cylinder or pump, a cooling-coil connected with the receiver or tank and immersed and covered together with the receiver or tank by the cooling medium in the receptacle, a valve-controlled discharge-pipe connected with the cooling-coil, a receptacle or chamber into which the discharge-pipe projects air, a water-supply pipe having a discharge perforated head or rose located in the receptacle or chamber into which the compressed air is projected, for the air to congeal or freeze the spray or drops of water as they descend in the receptacle or chamber, a mold into which the frozen spray or drops of water are deposited for formation into a cake of ice, and a water-supply pipe leading into the mold, for filling the spaces or interstices of the frozen spray or drops and producing a solid cake of ice, substantially as described.

7. In an apparatus for refrigerating, congealing and freezing, the combination of an air-compressing cylinder or pump, a receptacle adapted to contain a cooling medium, an initial or first air receiver or tank, a final or discharge air receiver or tank having communication with the first or initial air receiver or tank, into which receivers or tanks air is forced and stored under pressure from the compressing cylinder or pump, a cooling-coil connected with the final or discharge air receiver or tank and surrounding both tanks and immersed and covered together with the receivers or tanks by the cooling medium in the receptacle and an eduction-pipe leading from the coil to discharge the compressed air into an atmosphere of less density thereby allowing it to expand, substantially as described.

8. In an apparatus for refrigerating, congealing and freezing, the combination of an air-compressing cylinder or pump, a receptacle adapted to contain a cooling medium, an initial or first air receiver or tank, a final or discharge air receiver or tank having communication with the first or initial air receiver or tank, into which receivers or tanks air is forced and stored under pressure from the compressing cylinder or pump, a cooling-coil connected with the final or discharge air receiver or tank and surrounding both tanks and immersed and covered together with the receivers or tanks by the cooling medium in the receptacle, and a valve-controlled discharge-pipe connected with the cooling-coil, substantially as described.

JOHN F. SANDERS.

Witnesses:
D. C. BLAKE,
W. M. LA SHELL.